US010807120B2

(12) United States Patent
Goad et al.

(10) Patent No.: US 10,807,120 B2
(45) Date of Patent: Oct. 20, 2020

(54) FOAM TAPE

(71) Applicant: Rubberlite, Inc., Huntington, WV (US)

(72) Inventors: Jeffrey Dale Goad, Barboursville, WV (US); Christopher Michael Brown, Lakewood, OH (US)

(73) Assignee: Rubberlite, Inc., Huntington, WV (US)

( * ) Notice: Subject to any disclaimer, the term of this patent is extended or adjusted under 35 U.S.C. 154(b) by 0 days.

(21) Appl. No.: 15/245,235

(22) Filed: Aug. 24, 2016

(65) Prior Publication Data

US 2017/0058149 A1 Mar. 2, 2017

Related U.S. Application Data

(60) Provisional application No. 62/283,221, filed on Aug. 24, 2015, provisional application No. 62/331,475, filed on May 4, 2016.

(51) Int. Cl.
*C09J 7/20* (2018.01)
*C09J 7/26* (2018.01)
(Continued)

(52) U.S. Cl.
CPC ............... *B05D 1/28* (2013.01); *B05D 1/02* (2013.01); *C09J 7/201* (2018.01); *C09J 7/22* (2018.01);
(Continued)

(58) Field of Classification Search
CPC ......... B32B 5/18; B32B 5/20; B32B 2405/00; B32B 5/00; B32B 7/00; B32B 7/04; B32B 7/12; B32B 25/00; B32B 25/04; B32B 25/045; B32B 25/08; B32B 25/14; B32B 25/16; B32B 25/18; B32B 25/20; B32B 27/00; B32B 27/04; B32B 27/06; B32B 27/065; B32B 27/08; B32B 27/30; B32B 27/302; B32B 27/306; B32B 27/308; B32B 27/32; B32B 27/40; B32B 2255/10; B32B 2255/102; B32B 2255/26; B32B 2266/02; B32B 2266/027; B32B 2266/0278; B32B 2307/718; B32B 2307/72; B32B 2307/748; C09J 7/00; C09J 7/02; C09J 7/0239; C09J 7/025; C09J 7/20; C09J 7/201; C09J 7/22; C09J 7/25; C09J 7/26; C09J 7/30; C09J 7/38; C09J 7/381; C09J 7/383; C09J 7/385; C09J 7/387; C09J 7/40; C09J 7/401; C09J 2475/00; C09J 2475/005; C09J 2475/006;
(Continued)

(56) References Cited

U.S. PATENT DOCUMENTS 3,993,833 A * 11/1976 Esmay .................. C09J 7/26
428/317.3
6,352,766 B1 * 3/2002 Crandall .................. C09J 7/401
428/343
(Continued)

FOREIGN PATENT DOCUMENTS

EP         0448399 A2 *  9/1991  ............ C08F 220/36

*Primary Examiner* — Maria V Ewald
*Assistant Examiner* — Ethan A. Utt
(74) *Attorney, Agent, or Firm* — Barnes & Thornburg LLP

(57) ABSTRACT

The present disclosure is directed to a foam tape product that does not require a release paper or other release material to prevent sticking on or within itself upon rolling. A method of manufacturing the foam tape product and kit are also provided.

12 Claims, 1 Drawing Sheet

(51) Int. Cl.
*C09J 7/22* (2018.01)
*C09J 7/40* (2018.01)
*B05D 1/28* (2006.01)
*B05D 1/02* (2006.01)

(52) U.S. Cl.
CPC ................ *C09J 7/26* (2018.01); *C09J 7/401* (2018.01); *C09J 2201/122* (2013.01); *C09J 2201/606* (2013.01); *C09J 2400/243* (2013.01); *C09J 2421/00* (2013.01); *C09J 2475/005* (2013.01); *C09J 2475/006* (2013.01); *C09J 2483/005* (2013.01); *Y10T 428/2839* (2015.01)

(58) Field of Classification Search
CPC ............. C09J 2483/00; C09J 2483/005; C09J 109/00; C09J 109/02; C09J 109/06; C09J 111/00; C09J 123/00; C09J 123/02; C09J 123/04; C09J 123/08; C09J 123/0846; C09J 123/0853; C09J 123/18; C09J 123/20; C09J 123/22; C09J 125/00; C09J 125/02; C09J 125/04; C09J 125/08; C09J 125/10; C09J 125/12; C09J 133/00; C09J 133/04; C09J 133/06; C09J 133/08; C09J 133/10; C09J 133/12; C09J 133/18; C09J 133/20; C09J 133/22; C09J 143/00; C09J 143/04; C09J 2203/30; C09J 2203/302; C09J 2203/306; C09J 2411/00; C09J 2423/00; C09J 2423/04; C09J 2425/00; C09J 2433/00; Y10T 428/249953; Y10T 428/249958; Y10T 428/249955; Y10T 428/249982; Y10T 428/249983; Y10T 428/249985; Y10T 428/249987; Y10T 428/249991; Y10T 428/28; Y10T 428/2839; Y10T 428/2848; Y10T 428/2852; Y10T 428/2878; Y10T 428/2883; Y10T 428/2887; Y10T 428/2891; Y10T 428/24942; Y10T 428/2495; Y10T 428/24959; Y10T 428/24967; Y10T 428/24975; Y10T 428/24983; Y10T 428/24992; Y10T 428/26; Y10T 428/263; Y10T 428/264; Y10T 428/265; Y10T 428/266; Y10T 428/269; Y10T 428/27; Y10T 428/273; Y10T 428/31551; Y10T 428/31554; Y10T 428/31573; Y10T 428/31576; Y10T 428/31583; Y10T 428/31587; Y10T 428/31598; Y10T 428/31663; Y10T 428/31855; Y10T 428/31909; Y10T 428/31913; Y10T 428/31917; Y10T 428/31924; Y10T 428/31928; Y10T 428/31931; Y10T 428/31935; Y10T 428/31938
USPC ......... 428/304.4, 308.4, 317.1, 317.3, 317.7, 428/318.4, 319.3, 343, 352, 354, 355, 428/355 R, 355 EN, 355 BL, 355 CN, 428/355 AC, 351, 355 A, 212–220, 332, 428/334–337, 339–341, 306.6, 423.1, 428/423.3, 424.2, 424.4, 424.7, 425.5, 428/446, 447, 500, 515–517, 519–523
See application file for complete search history.

(56) References Cited

U.S. PATENT DOCUMENTS

| | | | | |
|---|---|---|---|---|
| 2002/0170465 | A1* | 11/2002 | Scholz | C09J 7/201 106/287.11 |
| 2005/0069698 | A1* | 3/2005 | Eubanks | B44C 1/105 428/354 |
| 2008/0166553 | A1* | 7/2008 | Aarts | C09J 7/22 428/343 |
| 2014/0170362 | A1* | 6/2014 | Ali | C09J 7/385 428/355 AC |

* cited by examiner

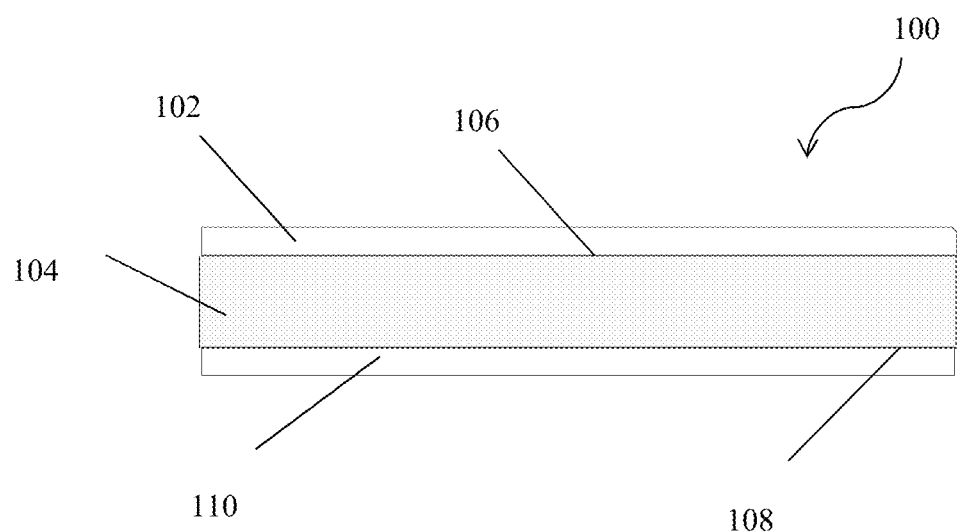

FOAM TAPE

CROSS-REFERENCE TO RELATED APPLICATIONS

The present application claims priority to U.S. Provisional Application No. 62/283,221 filed Aug. 24, 2015 and U.S. Provisional Application No. 62/331,475 filed May 4, 2016, each of which are incorporated herein.

BACKGROUND OF THE INVENTION

Traditional polyurethane foam tape includes a backing to prevent pressure sensitive adhesive from adhering or sticking to the opposite side of the foam tape. For example, traditional white release paper is applied to one side of the tape to prevent such sticking. The use of such a release material, however, increases cost of manufacturing, increases shipping costs, makes installation difficult due to the need to remove at installation, and causes a negative environmental impact. Thus, there remains a need for a foam tape that reduces or eliminates such issues.

SUMMARY OF THE INVENTION

The present disclosure is directed to foam tape. The foam tape product as provided herein is a self-wound foam tape that does not require a release paper or other release material to prevent sticking on or within itself upon rolling. Thus, there is no paper to peel back and dispose of at the point of application resulting in a cleaner, simpler, and more efficient application that also reduces waste. The foam tape as provided herein reduces the weight of the foam tape substantially in comparison to traditional foam tape with release paper, thus reducing shipping and material handling costs. The foam tape as provided herein also maintains roll integrity and does not unravel (i.e., remains self-wound) yet does not harm or otherwise disrupt the underlying foam tape face when unwound thus resulting a user-friendly foam tape roll. The foam tape may be utilized in various dispensing tools specifically designed for specific applications of the tape.

According to one aspect, a foam tape product is provided. The foam tape product includes an open-cell foam substrate having a first side and a second, opposing side. The first side of the open-cell foam substrate is coated with a pressure sensitive adhesive. The second side of the open-cell foam substrate is coated with a release coating composition. The release coating composition includes a skin coat composition and an emulsion polymer composition. According to one embodiment, the foam substrate does not require a relase paper attached to the first or second side prior to application to a target surface. According to one embodiment, the skin coat composition includes a polyurethane dispersion. According to one embodiment, the emulsion polymer composition includes an aqueous silicon fluid emulsion. According to one embodiment, the aqueous silicon fluid emulsion includes at least one base release polymer, a crosslinking component, and a catalyst. According to one embodiment, the pressure sensitive adhesive includes one or more acrylic, butyl rubber, ethylene-vinyl acetate (EVA), nitrile, silicone rubber, styrene block copolymer, styrene-isoprene-styrene, styrene-butadine-styrene, sytrene-ethylene/butylene-sytrene, styrene-ethylene/propylene, vinyl ethers, polychloroprene, or a combination thereof. According to one embodiment, the foam tape product includes a thickness of from about 0.03 inches to about 1.50 inches. According to one embodiment, the foam tape product includes a width of from about 0.03 inches to about 5.0 inches wide. According to one embodiment, the density of the open-cell foam substrate is from about 5 lbs/ft$^3$ to about 40 lbs/ft$^3$. According to one embodiment, the release coating composition includes from about 2.5 weight % to about 30 weight % of the aqueous emulsion polymer composition with the balance of the release coating composition comprising the skin coat composition. According to one embodiment, the release coating composition is applied to the second side of the open-cell foam tape at a weight of from about 1.0 grams/100 cm$^2$ to about 1.9 grams/100 cm$^2$. According to one embodiment, the foam tape product exhibits a peel strength of from about 0.3 pounds to about 0.5 pounds according to ASTM D1876. According to one embodiment, the addition of the release coating composition prevents the pressure sensitive adhesive from adhering to the foam face with the release coating composition such that upon rolling, thereby preventing any damage when unwound. According to one embodiment, the foam tape product as provided herein can be rolled upon itself without any additional release material or substate as is typically required with foam tapes. According to one embodiment, the coating does not diminish the adhesive strength of the pressure sensitive adhesive (e.g., maintains peel strength) when applied at the point of use.

According to another aspect, a method of preparing a foam tape roll product is provided. The method includes the steps of preparing an open-cell foam substrate having a first side and second side, applying a pressure sensitive adhesive to a first side of the foam, and applying a release coating composition to a second side of the foam. The release coating composition includes a skin coat composition and an emulsion polymer composition. According to one embodiment, the method further includes the steps of preparing the skin coat composition, preparing the emulsion polymer composition, and combining the skin coat composition and emulsion polymer composition to form the release coating composition. According to one embodiment, the release coating composition is applied via knife over roll, spray, or screen coat. According to one embodiment, the open-cell foam substrate is skived during production to expose an open cellular structure.

According to another aspect a foam tape kit is provided. The kit includes a foam tape as provided herein and at least one set of instructions.

BRIEF DESCRIPTION OF THE DRAWINGS

FIG. 1 illustrates one embodiment of the foam tape as provided herein.

DETAILED DESCRIPTION

The present disclosure will now be described more fully hereinafter with reference to exemplary embodiments thereof. These exemplary embodiments are described so that this disclosure will be thorough and complete, and will fully convey the scope of the disclosure to those skilled in the art. Indeed, the present disclosure may be embodied in many different forms and should not be construed as limited to the embodiments set forth herein; rather, these embodiments are provided so that this disclosure will satisfy applicable legal requirements. As used in the specification, and in the appended claims, the singular forms "a", "an", "the", include plural referents unless the context dearly dictates otherwise.

The present disclosure provides a foam tape that requires no release material (e.g., paper) to peel back and dispose or at the point of application thus making for a cleaner, simpler, and efficient application. As a result, the foam tape as provided herein reduces the weight of the final product thereby substantially reducing shipping and material handling costs. The foam tape as provided herein also provides consistent peel strength throughout an entire roll of foam such that even under immense pressure at an inner ring of a roll, the foam tape may be peeled back without resulting in damage to the underlying foam tape layer or complete prevention of the foam tape from uncoupling with the underlying foam tape layer. The foam tape as provided herein also exhibits sufficient peel strength such that the foam tape may be unwound and rewound at least one time while maintaining a peel strength substantially similar to that of the unwound tape.

According to one embodiment, the foam tape includes at least one open-cell foam. According to one embodiment, the foam is a non-integral skin foam. According to one embodiment, the foam is breathable. According to one embodiment, the foam is a high compression foam. The foam may include one or more of a variety of acceptable polymers. According to one embodiment, the foam includes polyurethane foam. According to one embodiment, the foam includes polyester based polyurethane foam. According to one embodiment, the foam includes polyether based polyurethane foam.

The foam portion of the foam tape as provided herein may be prepared according to various techniques. According to one embodiment, the foam is prepared via a continuous free-rise pour. According to one embodiment, no external blowing agents are introduced during preparation of the foam. According to one embodiment, the foam as provided herein is blown via the release and expansion of carbon dioxide that is generated during a reaction with various reactants including, but not limited to, isocyanate and water. Cellular structure of the foam may be adjusted based on nucleation control, the addition of various additives, and varying process parameters. According to one embodiment, one or more components are introduced and metered to the foam via a mix head during preparation including, but not limited to, methylene diphenyl diisocyanate-based isocyanates and polyol. According to one embodiment, the mix head mixes the reactants sufficiently within a short residence time of typically from about 0.2 second to typically about 1 second nominally. The resulting mixture may then be poured onto a moving belt as a free flowing liquid. The ensuing exothermic reaction generates an open-cell foam through expansion and gelling.

According to one embodiment, the foam may be poured as a continuous pour during preparation and subsequently cut into large rectangles having typically about 100 ft. lengths and a width of typically about 60 inches on a manufacturing line, although the length and width may vary according to a particular manufacturing line. The thickness of the continuous pour varies according to density. According to one embodiment, the resulting cut foam may be skived to a target thickness and wound into a log roll. According to one embodiment, the foam tape may be skived during production to expose an open cellular structure. By skiving the tape surface, the open cellular structure is exposed much more prominently than mechanically frothed foam products which, in turn, make the skived foam susceptible to tearing upon removal of a pressure sensitive adhesive on one side.

According to one embodiment, the foam utilized in the foam tape as provided herein exhibits a density that is acceptable for a wide variety of applications. According to one embodiment, the foam exhibits a density of typically from about 1 lbs/ft$^3$ to typically about 75 lbs/ft$^3$. According to another embodiment, the foam exhibits a density of typically from about 1.5 lbs/ft$^3$ to typically about 62.5 lbs/ft$^3$. According to another embodiment, the foam exhibits a density of typically from about 2 lbs/ft$^3$ to typically about 50 lbs/ft$^3$. According to another embodiment, the foam exhibits a density of typically from about 5 lbs/ft$^3$ to typically about 40 lbs/ft$^3$. According to another embodiment, the foam exhibits a density of typically from about 10 lbs/ft$^3$ to typically about 16 lbs/ft$^3$.

According to one embodiment, one side of the foam includes a pressure sensitive adhesive composition. According to one embodiment, the pressure sensitive adhesive composition does not require heat, water, or solvent for the foam to adhere to a target surface. The pressure sensitive adhesive composition may be adjusted to adapt to the intended use of the foam tape. According to one embodiment, the pressure sensitive adhesive composition includes one or more acrylic, butyl rubber, ethylene-vinyl acetate (EVA), nitrile, silicone rubber, styrene block copolymer, styrene-isoprene-styrene, styrene-butadine-styrene, sytrene-ethylene/butylene-sytrene, styrene-ethylene/propylene, vinyl ethers, polychloroprene, or a combination thereof. The pressure sensitive adhesive composition as provided herein is not ink imprintable.

According to one embodiment, one side of the foam includes a release coating composition that limits the adhesion of the pressure sensitive adhesive on the opposing face, thereby preventing any damage when unwound. According to one embodiment, the release coating composition reduces the adhesion of the pressure sensitive side of the tape to an underlying opposite side of the foam tape while still allowing for enough tack to maintain contact between the two sides of the foam tape in order to keep a foam wheel or roll in a self-wound or rolled configuration (i.e., prevent unraveling of the roll prior to use). The release coating composition may be manufactured and applied in various formulations such as, for example, a liquid, solid, semi-solid, paste, spray or froth. The release coating composition as provided herein is not ink imprintable.

According to a particular embodiment, the release coating composition includes a multiple component system that is blended, mixed or otherwise combined to form the resulting release coating composition. The amounts of the components within the release composition may be varied to achieve specific tack and release properties as well as be varied according to the foam tape's end application. According to one embodiment, a high density foam with high tear strength and fine cell structure requires less release coating composition for optimization. According to an alternative embodiment, a low density, coarse cell structure foam requires a higher level of release coating composition to prevent foam tear and ensure good release.

According to one embodiment, the release coating composition includes from about 1% to about 60% of an aqueous emulsion polymer composition with the balance of the coating composition made up of the skin coat composition. According to another embodiment, the release coating composition includes from about 2.5% to about 30% aqueous emulsion polymer composition with the balance of the release coating composition made up of the skin coat composition. According to another embodiment, the release coating composition includes from about 5% to about 20% aqueous emulsion polymer composition with the balance of the release coating composition made up of the skin coat composition.

The release coating composition as provided herein may be prepared according to acceptable coating preparations techniques including, but not limited to, batch agitation in a mixing vessel. According to a particular embodiment, the skin coat composition and emulsion polymer composition components are initially prepared separately and subsequently blended, mixed or otherwise combined in a batch blending vessel to form a single release coating composition as provided herein. According to a particular embodiment, the emulsion polymer composition is initially prepared separately and the individual components of the skin coat composition are subsequently blended, mixed or otherwise combined in a batch blending vessel to form a single release coating composition as provided herein.

According to one embodiment, the skin coat composition includes at least one polyurethane composition. According to one embodiment, the polyurethane composition includes at least one polyurethane emulsion polymer. According to one embodiment, the polyurethane composition imparts flexibility, smooth feel, and low gloss to the release coating composition. Suitable polyurethane emulsion polymers include those commercially available as Bondthane UD-375 and Impranil DLS. According to one embodiment, the release coating composition includes from about 50% weight to about 99% weight of at least one polyurethane emulsion polymer. According to one embodiment, the release coating composition includes from about 55% weight to about 80% weight of at least one polyurethane emulsion polymer. According to one embodiment, the release coating composition includes from about 60% weight to about 75% weight of at least one polyurethane emulsion polymer.

According to one embodiment, the skin coat composition includes at least one silicone surfactant. Suitable silicone surfactants include those commercially available as BYK-024 and BYK-348. According to one embodiment, the release coating composition includes from about 0.50% weight to about 2.50% weight of at least one silicone surfactant. According to one embodiment, the release coating composition includes from about 0.75% weight to about 2.00% weight of at least one silicone surfactant. According to one embodiment, the release coating composition includes from about 1.20% weight to about 1.70% weight of at least one silicone surfactant.

According to one embodiment, the skin coat composition includes at least one dispersing agent. A suitable dispersing agent is that commercially available as Carbopol EP-1. According to one embodiment, the release coating composition includes from about 1.5% weight to about 3.0% weight of at least one dispersing agent. According to one embodiment, the release coating composition includes from about 1.75% weight to about 2.75% weight of at least one dispersing agent. According to one embodiment, the release coating composition includes from about 2.00% weight to about 2.75% weight of at least one dispersing agent.

According to one embodiment, the skin coat composition optionally includes at least one colorant, coloring agent or pigment. A suitable colorant includes that commercially available as Foam Black 988. According to one embodiment, the release coating composition includes from about 0.75% weight to about 1.25% weight of at least one colorant.

The skin coat composition as provided herein may further include one or more copolymers such as, for example, vinyl acrylic copolymer. According to one embodiment, the coat composition may further include one or more suitable additives. Suitable additives include, but are not limited to, polyether modified siloxane, texturing agents, thickeners, stabilization agents, frothing aids, colorants, pigments, and foaming agents. According to one embodiment, the skin coat composition is cross-linked.

According to one embodiment, the emulsion polymer composition includes various components that may be adjusted to provide a specific level of tack and release. According to one embodiment, the emulsion polymer composition includes an aqueous silicon fluid emulsion. According to a particular embodiment, the emulsion polymer composition includes a three component aqueous emulsion system that includes, for example, at least one base release polymer, a crosslinking component, and a catalyst. According to a preferred embodiment, the emulsion polymer composition includes a three component aqueous silicone fluid emulsion system such as that available Wacker Chemical specifically intended to prevent adhesion (e.g., Dehesive EM 427, Crosslinker V 15, and Catalyst EM 459).

According to one embodiment, the release coating composition includes from about 0.01% weight to about 30% weight of at least one base release polymer. According to one embodiment, the release coating composition includes from about 1% weight to about 25% weight of at least one base release polymer. According to one embodiment, the release coating composition includes from about 5% weight to about 20% weight of at least one base release polymer. According to one embodiment, the release coating composition includes from about 10% weight to about 20% weight of at least one base release polymer.

According to one embodiment, the release coating composition includes from about 0.01% weight to about 5% weight of at least one catalyst. According to one embodiment, the release coating composition includes from about 0.05% weight to about 3% weight of at least one catalyst. According to one embodiment, the release coating composition includes from about 0.09% weight to about 1.9% weight of at least one catalyst.

According to one embodiment, the release coating composition includes from about 0.01% weight to about 5% weight of at least one crosslinker. According to one embodiment, the release coating composition includes from about 0.05% weight to about 3% weight of at least one crosslinker. According to one embodiment, the release coating composition includes from about 0.09% weight to about 1.9% weight of at least one crosslinker.

According to one embodiment, the release coating composition is applied to a foam substrate as provided herein according to various acceptable techniques. According to one embodiment, the release coating composition is applied to the foam via a continuous knife over roll. According to another embodiment, the release coating composition is applied to the foam via spray application. According to another embodiment, the release coating composition is applied to the foam via a screen coat application.

Once applied, the release coating composition may be dried and cured in an oven. The oven dwell time may vary. According to one embodiment, the oven dwell time is typically from about 20 seconds to typically about 5 minutes. According to another embodiment, the oven dwell time is typically from about 40 seconds to typically about 4 minutes. According to another embodiment, the oven dwell time is typically from about 60 seconds to typically about 3 minutes. The oven temperature may also vary. According to one embodiment, the oven temperature is typically between about 90° C. and about 170° C. According to another embodiment, the oven temperature is typically between about 100° C. and about 160° C. According to another embodiment, the oven temperature is typically between about 110° C. and about 150° C.

The pressure sensitive adhesive composition as provided herein may be applied to the opposite side of the foam to that of the pressure sensitive adhesive according to various acceptable techniques. According to one embodiment, the pressure sensitive adhesive includes a double sided adhesive tape that is applied to the foam via a roll lamination technique. A heat assist may be applied in combination with the roll lamination. According to such an embodiment, the double sided adhesive tape includes a polyester film between two adhesive layers. According to another embodiment, the pressure sensitive adhesive composition is applied using direst adhesive casting techniques. According to a particular embodiment, a wet pressure sensitive adhesive emulsion is applied to one side of the foam and subsequently dried in an oven.

The release coating composition may be applied to the foam as provide herein at various coat weights. According to one embodiment, the release coating composition is applied at weights from typically about 0.01 grams/100 $cm^2$ to typically about 4.0 grams/100 $cm^2$. According to one embodiment, the release coating composition is applied at weights from typically about 0.02 grams/100 $cm^2$ to typically about 2.6 grams/100 $cm^2$. According to one embodiment, the release coating composition is applied at weights from typically about 1.0 grams/100 $cm^2$ to typically about 1.9 grams/100 $cm^2$.

The open-cell foam tape product as provided herein may be prepared according to various manufacturing techniques. An open-cell foam log roll as provided herein may be unwound on a coating line and subject to application of the release coating composition via the techniques described herein. The coated foam emerging from the coating line may then be wound up on a rewinder wheel at the end of the coating line to create a coated log roll. The coated log roll may then be unrolled on a lamination machine where the pressure sensitive adhesive is laminated to an opposing side of the coated foam and rewound to form a coated, pressure sensitive laminated log roll. The log roll may then be introduced to a levering machine that slices the coated, pressure sensitive laminated log roll into strips (perpendicular to a core tube). According to an exemplary embodiment, a 60" coated, pressure sensitive laminated log roll may be cut to generate 96 wheels of a 0.625" wide rolled foam tape. The rolled foam tape may be them be commercially packaged for sale.

According to one embodiment, the foam tape as provided herein exhibits a thickness that is acceptable for a wide variety of applications. According to one embodiment, the foam tape as provided herein exhibits a thickness of typically from about 0.03 inches to typically about 1.50 inches. According to one embodiment, the foam tape as provided herein exhibits a thickness of typically from about 0.06 inches to typically about 1.0 inches. According to one embodiment, the foam tape as provided herein exhibits a thickness of typically from about 0.125 inches to typically about 0.50 inches.

According to one embodiment, the foam tape as provided herein exhibits a width that is acceptable for a wide variety of applications. The foam tape as provided herein is typically manufactured as a log roll. The log roll may be placed within a log roll cutting machine or lathe slitting machine. According to a particular embodiment, the log rolls are spun on a mandrel and cut with at least one blade to precisely cut the log to desired widths of foam tape. According to one embodiment, the foam tape as provided herein exhibits a width of typically from about 0.03 inches to typically about 5.0 inches. According to one embodiment, the foam tape as provided herein exhibits a width of typically from about 0.06 inches to typically about 4.0 inches. According to one embodiment, the foam tape as provided herein exhibits a width of typically from about 0.125 inches to typically about 3.0 inches.

According to one embodiment, the foam tape as provided herein exhibits a peel strength of less than about 1.50 pounds according to ASTM D1876, the contents of which are incorporated herein by reference. According to one embodiment, the foam tape as provided herein exhibits a peel strength of less than about 1.00 pounds according to ASTM D1876. According to one embodiment, the foam tape as provided herein exhibits a peel strength of less than about 0.50 pounds according to ASTM D1876.

The foam tape as provided herein may be utilized in various applications where seals or cushion points are needed. According to one embodiment, the foam tape may be utilized in heating, ventilating and air conditioning applications such as, for example, as a dust seal, dust barrier, sealing gasket, or compression gasket. According to one embodiment, the foam tape may be utilized for panel enclosures and vibration dampening gaskets. According to one embodiment, the foam tape may be utilized in construction applications such as, for example, around the perimeter of various means of entry or exit (e.g., windows or doors). According to one embodiment, the foam tape may be utilized in automotive applications. According to one embodiment, the foam tape may be utilized in electrical enclosure applications.

FIG. 1 illustrates one embodiment of the foam tape 100 as provided herein. As illustrated, pressure sensitive adhesive 102 is laminated to the foam 104 on a first side 106. Also, as illustrated, the foam 104 is coated on an opposite or second side 108 with a coating composition 110.

Although specific embodiments of the present invention are herein illustrated and described in detail, the invention is not limited thereto. The above detailed descriptions are provided as exemplary of the present invention and should not be construed as constituting any limitation of the invention. Modifications will be obvious to those skilled in the art, and all modifications that do not depart from the spirit of the invention are intended to be included with the scope of the appended claims.

Having generally described the present invention, a further understanding can be obtained by reference to the examples provided herein for purposes of illustration only and are not intended to be limiting.

EXAMPLE 1

The open-cell foam substrate utilized in the following examples was prepared according to the following procedure.

A blend of polyol, catalysts, surfactants, and diols was fed to a mix head. A methylene diphenyl diisocyanate-based isocyanate pre-polymer blend was also fed independently and continuously to the mix head. Stoichiometric ratios of functional groups were controlled by ratio flow control. The mix head impeller mixed and then discharged the mixed reactive materials onto a release liner on a conveyor belt. The continuous pour was approximately 60 inches wide. No external blowing agents were used. Cellular structure was achieved via the reaction of iscoyanate with water which released carbon dioxide as a product of the exothermic reaction. The carbon dioxide blew the foam to the final foam density. The pour was a free-rise pour in which the rise was unconstrained. The foam was formed as the foam traveled down the conveyor. The foam was cut into 100 foot lengths for material handling purposes.

EXAMPLE 2

The release coating compositions utilized in the following examples was prepared according to the following procedure. The release coating composition was prepared by simple agitation means in a vessel. A propeller style impeller was used to first blend the release polymer, the cross-linker, and the catalyst to form the emulsion polymer composition. The skin coat composition portion of the coating was then formed by blending the components set forth in Table 1 via the same means in a separate vessel. The skin coat composition and emulsion polymer composition were then independently blended, combined and agitated in a single vessel. This mixture was then transferred to the proper application equipment.

The following release coating compositions were prepared according to the aforementioned procedure with the following component amounts as shown in Table 1.

A rubber based pressure sensitive adhesive was then applied to an opposite side of the foam via the following procedure to form a foam tape. The pressure sensitive adhesive film (M1207 rubber based adhesive from CCT) was laminated onto the foam via nip rollers with heat assist to aid in the adhesion of the adhesive to the foam. The corresponding laminate was then rewound to a log. Such a process was utilized on samples VIII-XVIII as set forth in Table 2. Laboratory versions were also made with direct applied acrylic adhesives via draw down bar application and then dried in an oven to ultimately achieve the same product, a pressure sensitive adhesive on one side of the foam and release coating composition on the opposing side of the foam. Such a process was utilized on samples I-VII as set forth in Table 2.

Peel strength testing was then performed according to ASTM D1876 on eighteen different foam tape samples (I-XVIII) having the release coating compositions with varying amounts of base release polymer and coat weight. Various foam densities were also utilized. ASTM D1876 evaluates the force (pounds) required to progressively separate two bonded, flexible surfaces. Each of a T-peel specimen is placed in separate test grips of a universal tension testing machine. The samples were cut from a T-peel panel

TABLE 1

| | | \multicolumn{6}{c}{Release Coating Composition} | | | | | |
|---|---|---|---|---|---|---|---|
| Function | Component | Wt. % | Wt. % | Wt. % | Wt. % | Wt. % | Wt. % |
| Skin Coat Composition | Polyurethane Emulsion Polymer (Bondthane UD-375) | 60.47% | 64.25% | 68.03% | 71.81% | 74.08% | 74.83% |
| | Polyurethane Emulsion Polymer (Impranil DLS) | 15.19% | 16.14% | 17.09% | 18.04% | 18.61% | 18.80% |
| | Silicone Surfactant (BYK-024) | 0.53% | 0.56% | 0.60% | 0.63% | 0.65% | 0.66% |
| | Silicone Surfactant (BYK-348) | 0.76% | 0.81% | 0.86% | 0.90% | 0.93% | 0.94% |
| | Colorant | 0.91% | 0.97% | 1.03% | 1.08% | 1.12% | 1.13% |
| | Dispersing Agent (Carbopol EP-1) | 2.13% | 2.27% | 2.40% | 2.53% | 2.61% | 2.64% |
| Emulsion Polymer Composition | Base Release Polymer (Dehesive EM 427) | 16.36% | 12.27% | 8.18% | 4.09% | 1.64% | 0.82% |
| | Catalyst (Catalyst EM 459) | 1.82% | 1.36% | 0.91% | 0.45% | 0.18% | 0.09% |
| | Crosslinking Agent (Crosslinker V15) | 1.82% | 1.36% | 0.91% | 0.45% | 0.18% | 0.09% |
| | Total | 100.00% | 100.00% | 100.00% | 100.00% | 100.00% | 100.00% |

EXAMPLE 3

A release coating composition and pressure sensitive adhesive were applied to opposite sides of an open-cell foam prepared as described in Example 1 and subject to peel strength testing. The release coating compositions were applied to the foam via a Stork CFT coater with a five stage gas fired drier. The knife-over-roll method was used with each of the first four stages of the drier set at 100° C. The final stage of the drier was left at ambient to aid in cooling the material. Final coat weights ranged from 63 grams per square meter to 396 grams per square meter with the optimum range in samples generated being 63 to 204 grams per square meter.

to 25.4 mm (1.0 in) long×300 mm (12 in) wide. The samples were pulled apart at a rate of 127 mm (5.0 in)/min for (5-in.) length. The results of the peel strength testing are provided in Table 2.

TABLE 2

| Sample ID | Peel Strength (lbs) | Weight % Base Release Polymer | Coat Weight (G/M$^2$) | Substrate Foam Density (lbs./ft$^3$) |
|---|---|---|---|---|
| I | 1.4 | 0 | 127 | 14 |
| II | 1.3 | 1 | 127 | 14 |
| III | 1.25 | 2 | 127 | 14 |
| IV | 0.301 | 5 | 127 | 14 |

TABLE 2-continued

| Sample ID | Peel Strength (lbs) | Weight % Base Release Polymer | Coat Weight (G/M²) | Substrate Foam Density (lbs./ft³) |
|---|---|---|---|---|
| V | 0 | 10 | 127 | 14 |
| VI | 0 | 15 | 127 | 14 |
| VII | 0 | 20 | 127 | 14 |
| VIII | 0.237 | 20 | 129 | 10 |
| IX | 0.159 | 20 | 150 | 10 |
| X | 0.121 | 20 | 396 | 10 |
| XI | 0.225 | 20 | 171 | 10 |
| XII | 0.338 | 18 | 185 | 10 |
| XIII | 0.154 | 18 | 219 | 10 |
| XVI | 0.513 | 12 | 102 | 14 |
| XVII | 0.427 | 12 | 123 | 14 |
| XVIII | 0.291 | 14 | 118 | 14 |

The results in Table 2 demonstrate how peel strength relates to foam tear when unwinding a roll of foam tape. The coat weight for samples I-IV was determined based on wet film thickness. The peel strength for samples V, VI and VIII was below the detection limit of the equipment utilized in the testing.

The data demonstrates that the two variables that prevent foam tear while maintaining sufficient tack to prevent a foam tape roll from unraveling are the amount of the base release polymer and the coat weight applied. Thus, the balance of tack and release can be adjusted by varying the amount of base polymer in the emulsion polymer composition of the release coating composition and the amount of release coating composition applied to the foam surface. These two variables are, in turn, dependent on the cellular structure (foam density) of the foam. The data demonstrates that less base release polymer is required in the release coating composition for a more dense foam. Further, less coat weight of the release coating composition is required to achieve the balance of adhesive tack and corresponding release. The higher density foam (14 lbs./ft³) exhibited 110-130 pores per inch for cell count. The lower density foam (10 lbs./ft³) exhibited 70-90 pores per inch. The samples that exhibited a peel strength of about 0.5 pounds were found to provide the optimal balance of tack and release.

We claim:

1. A foam tape product comprising
an open-cell foam substrate having a first side and a second, opposing side,
wherein the first side of the open-cell foam substrate is coated with a pressure sensitive adhesive that is not ink imprintable,
wherein the second side of the open-cell foam substrate is coated with a release coating composition, the release coating composition comprising
a skin coat composition comprising a polyurethane dispersion and at least one silicone surfactant; and
an aqueous emulsion polymer composition,
wherein the foam tape product exhibits a peel strength of from about 0.3 pounds to about 0.5 pounds according to ASTM D1876, and
wherein the release coating composition is applied to the second side of the open-cell foam substrate at a weight of from about 1.0 grams/100 cm² to about 1.9 grams/100 cm².

2. The foam tape product of claim 1, wherein the foam substrate does not require a release paper attached to the first or second side prior to application to a target surface.

3. The foam tape product of claim 1, wherein the emulsion polymer composition comprises an aqueous silicon fluid emulsion.

4. The foam tape product of claim 3, wherein the aqueous silicon fluid emulsion comprises at least one base release polymer, a crosslinking component, and a catalyst.

5. The foam tape product of claim 1, wherein the pressure sensitive adhesive comprises one or more of acrylic, butyl rubber, ethylene-vinyl acetate (EVA), nitrile, silicone rubber, styrene block copolymer, styrene-isoprene-styrene, styrene-butadiene-styrene, styrene-ethylene/butylene-styrene, styrene-ethylene/propylene, vinyl ethers, polychloroprene, or a combination thereof.

6. The foam tape product of claim 1, having a thickness of from about 0.03 inches to about 1.50 inches.

7. The foam tape product of claim 1, having a width of from about 0.03 inches to about 5.0 inches wide.

8. The foam tape product of claim 1, wherein the density of the open-cell foam substrate is from about 5 lbs/ft³ to about 40 lbs/ft³.

9. The foam tape product of claim 1, wherein the release coating composition comprises from about 2.5 weight % to about 30 weight % of the aqueous emulsion polymer composition with the balance of the release coating composition comprising the skin coat composition.

10. The foam tape product of claim 1, wherein the release coating composition comprises from about 10 weight % base release polymer to about 20 weight % base release polymer.

11. The foam tape product of claim 1, wherein the density of the open-cell foam substrate is from about 10 lbs/ft³ to about 16 lbs/ft³.

12. A foam tape kit comprising
a foam tape as provided in claim 1; and
at least one set of instructions.

* * * * *